(12) United States Patent
Bowers et al.

(10) Patent No.: US 7,127,137 B2
(45) Date of Patent: Oct. 24, 2006

(54) OPTICAL SWITCH WITH ADJUSTABLE OPTICAL LOSS

(75) Inventors: John Edward Bowers, Santa Barbara, CA (US); Shifu Yuan, Santa Barbara, CA (US); Roger Helkey, Montecito, CA (US); Xuezhe Zheng, Goleta, CA (US); James R. Sechrist, Goleta, CA (US)

(73) Assignee: Calient Networks, Inc., San Jose, CA (US)

( * ) Notice: Subject to any disclaimer, the term of this patent is extended or adjusted under 35 U.S.C. 154(b) by 0 days.

(21) Appl. No.: 11/136,759

(22) Filed: May 24, 2005

(65) Prior Publication Data

US 2005/0254747 A1 Nov. 17, 2005

Related U.S. Application Data

(63) Continuation of application No. 10/616,244, filed on Jul. 8, 2003, now Pat. No. 6,904,195.

(60) Provisional application No. 60/394,740, filed on Jul. 9, 2002.

(51) Int. Cl.
*G02B 6/26* (2006.01)
(52) U.S. Cl. .............................. 385/18; 385/16; 385/24
(58) Field of Classification Search ............ 385/16–24, 385/31–37
See application file for complete search history.

(56) References Cited

U.S. PATENT DOCUMENTS

| 6,456,751 | B1 | 9/2002 | Bowers et al. |
| 6,697,547 | B1 | 2/2004 | Walter et al. |
| 6,904,195 | B1 * | 6/2005 | Bowers et al. ................ 385/18 |

OTHER PUBLICATIONS

Roberto Gaudino, et al., "MOSAIC: A Multiwavelength Optical Subcarrier Multiplexed Controlled Network," IEEE Journal on Selected Areas in Communications, vol. 16, No. 7, pp. 1270-1285 (Sep. 1998).
S. Johansson, et al., "Optical Cross-Connect System in Broadband Networks: System Concept and Demonstrators Description," Journal of Lightwave Technology, vol. 11, No. 5/6, pp. 688-694 (May-Jun. 1993).

* cited by examiner

*Primary Examiner*—Phan Palmer
(74) *Attorney, Agent, or Firm*—Blakely, Sokoloff, Taylor & Zafman LLP

(57) ABSTRACT

An apparatus and method of controlling optical loss in an optical switch to equalize optical power or loss in a group of optical signals in an optical transmission system relatively insensitive to mechanical vibration. In one embodiment a group of optical signals is input into an optical switch and selected optical signals are variably attenuated using synchronized control to two mirrors in order to provide more uniform power distribution among the group of optical signals without enhancing vibration sensitivity of the optical switch.

9 Claims, 16 Drawing Sheets

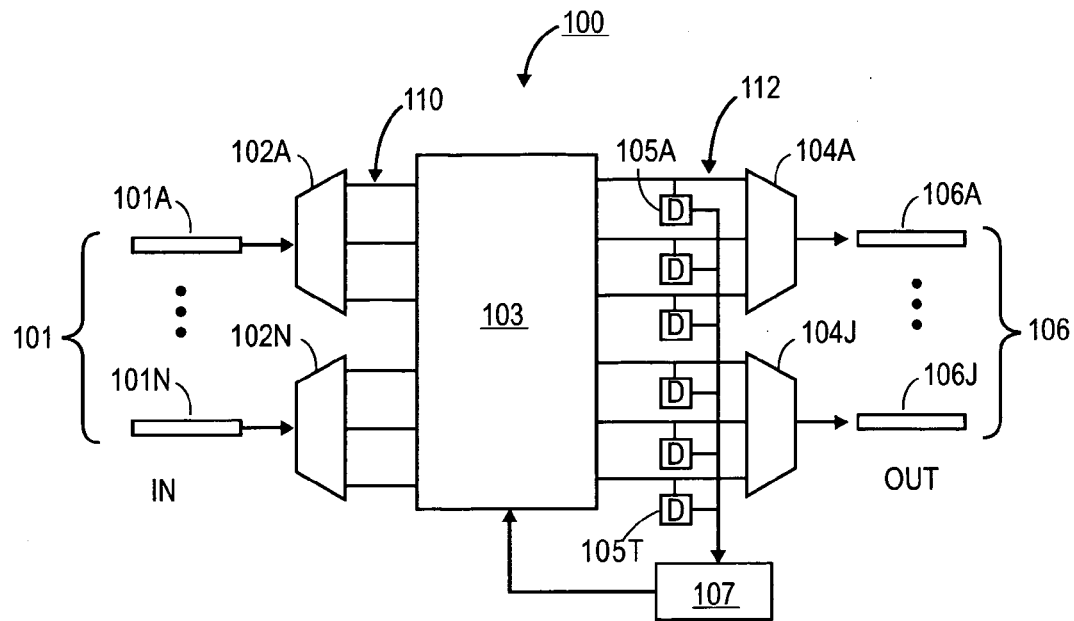
FIG. 1
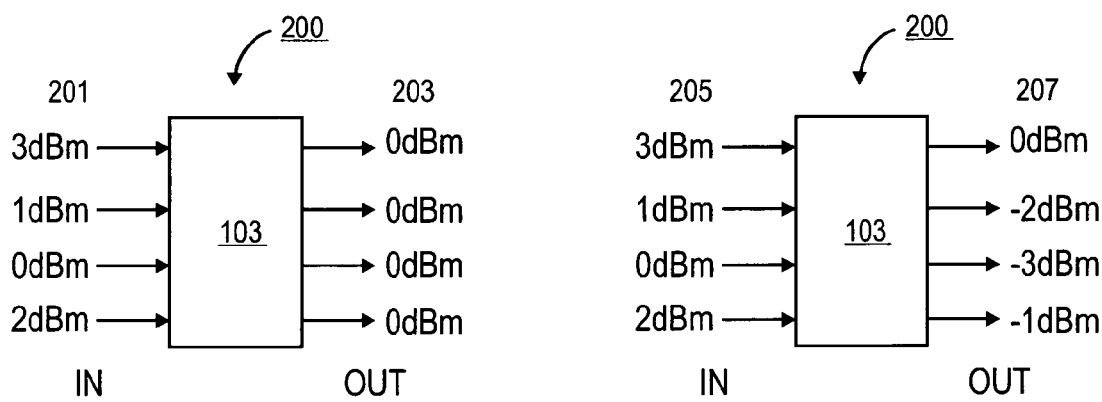
FIG. 2A
FIG. 2B

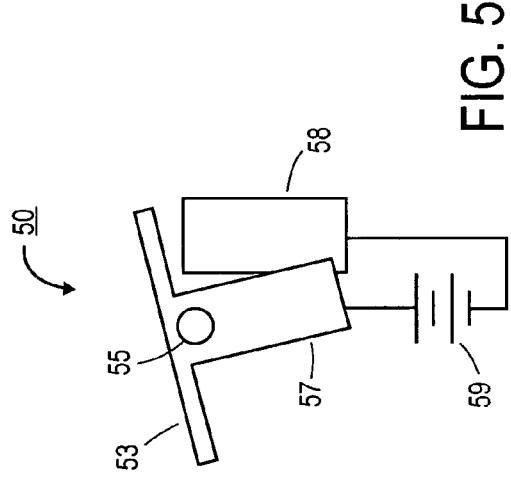
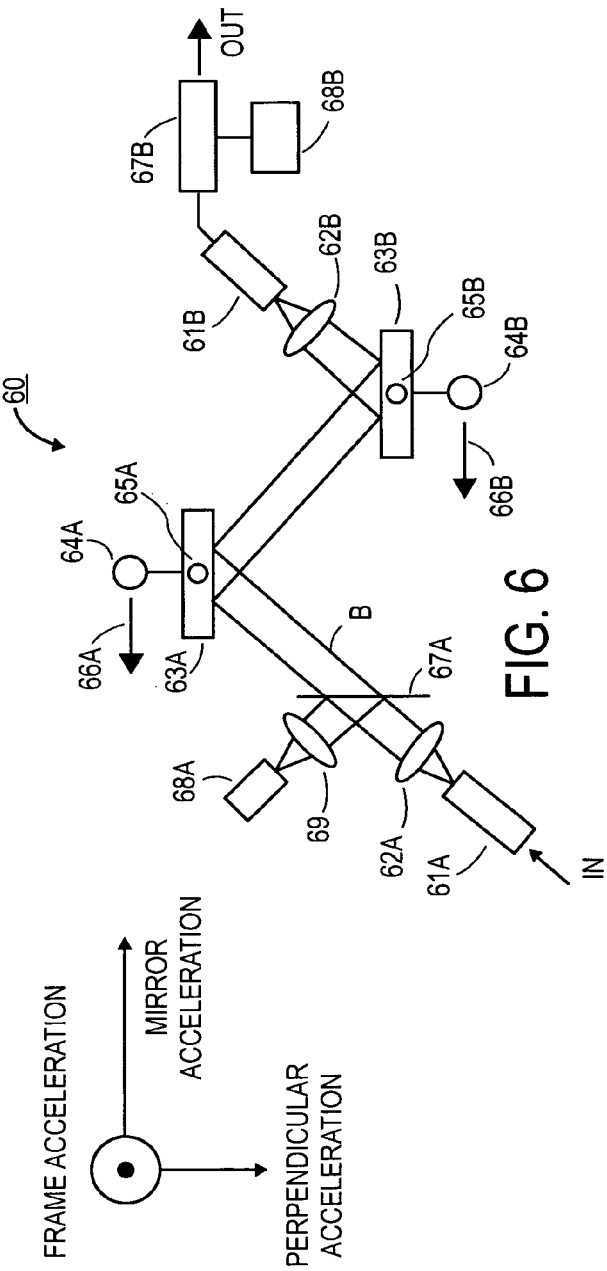
FIG. 5
FIG. 6

OPTICAL SWITCH WITH ADJUSTABLE OPTICAL LOSS

CROSS REFERENCE TO RELATED APPLICATIONS

The present application is a continuation application of U.S. patent application Ser. No. 10/616,244, filed Jul. 8, 2003, now U.S. Pat. No. 6,904,195 and claims the benefit of U.S. Provisional Application No. 60/394,740, filed Jul. 9, 2002.

FIELD OF THE INVENTION

This invention relates to power balancing (or equalization) of optical power between channels of fiber optic transmission systems. More particularly, the invention relates to power balancing in an optical system using optical switches in fiber optic transmission systems to selectively attenuate optical signals passing through the optical switches. Still more particularly, some embodiments of the invention relate to power balancing of the various optical channels in optical transmission systems that transmit a multitude of optical signals by the technique of Wavelength Division Multiplexing (WDM).

BACKGROUND OF THE INVENTION

Fiber optic systems play an increasingly important role in transmission of signals. A common application uses WDM to combine many independent optical signals of different wavelengths onto one optical fiber for long distance transmission. Signals are routed through the network by demultiplexing signals from a group of input fibers into an individual fiber for each signal, directing the signals using a large cross-connect switch, then recombining the signals using wavelength multiplexers onto a group of output fibers.

Since excessively strong optical signals saturate optical amplifiers and reduce the gain available to weaker signals, desired signal to noise ratio is maintained in the network by keeping the optical power at each wavelength approximately the same. Consequently, loss at each wavelength must be carefully controlled across the network.

It is known that loss can be controlled by using programmable optical attenuators before or after the optical switch at the point where each optical signal is separate. However, these programmable optical attenuators add substantial cost, complexity and loss to the network. See "Optical Cross-Connect System In Broadband Networks: System Concept And Demonstrators Description", Journal of Lightwave Technology, Vol. 11 (No. 5–6), May–June 1993, pp. 688–694, Johansson, S.; Lindblom, M.; Granestrand, P.; Lagerstrom, B.; Thylen, L.

An acousto-optic tunable filter (AOTF) can also be used in an optical network to equalize power levels as disclosed in, "MOSAIC: A Multiwavelength Optical Subcarrier Multiplexing Controlled Network", IEEE Journal on Selected Areas in Communications, Special Issue on High Capacity Optical Networks, 16 (7), 1270–1285 (September 1998), Gaudino, R.; Len, M; Desa, G.; Shell, M.; Blumenthal, D. J.

An alternate method of balancing optical power in an optical network by detuning an optical switch in order to equalize optical loss or optical power was disclosed in pending U.S. patent application Ser. No. 09/855,765, "Wavelength Power Equalization by Attenuation in an Optical Switch", which has issued as U.S. Pat. No. 6,697,547 B2. Balancing optical power is obtained by detuning one or more mirror electrodes in a MEMS-based switch using mirrors that rotate in two axes.

BRIEF SUMMARY OF THE INVENTION

According to one embodiment of the present invention, loss control in an optical network is obtained within a large optical switch having one or more two-dimensional arrays of movable mirrors for directing optical signals. Loss can be increased by detuning one or more mirrors away from the optimum angle for minimum loss. Because this approach generally results in unacceptable sensitivity to vibration, a technique is disclosed for detuning an input and output mirror with opposite vibration sensitivity to result in a system insensitive to vibration.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood with reference to the accompanying drawings, wherein like reference numerals designate like structural elements, and in which:

FIG. 1 is a block diagram of an optical transmission system.

FIG. 2 is an illustration of the operation of power equalization and loss equalization.

FIG. 5 illustrates a cross-section of the mirror geometry showing the mirror actuator.

FIG. 6 illustrates the switch geometry showing the relationship of the center of mass of the mirrors with respect to the hinges.

DETAILED DESCRIPTION OF THE PREFERRED EMBODIMENTS

Figure 3:
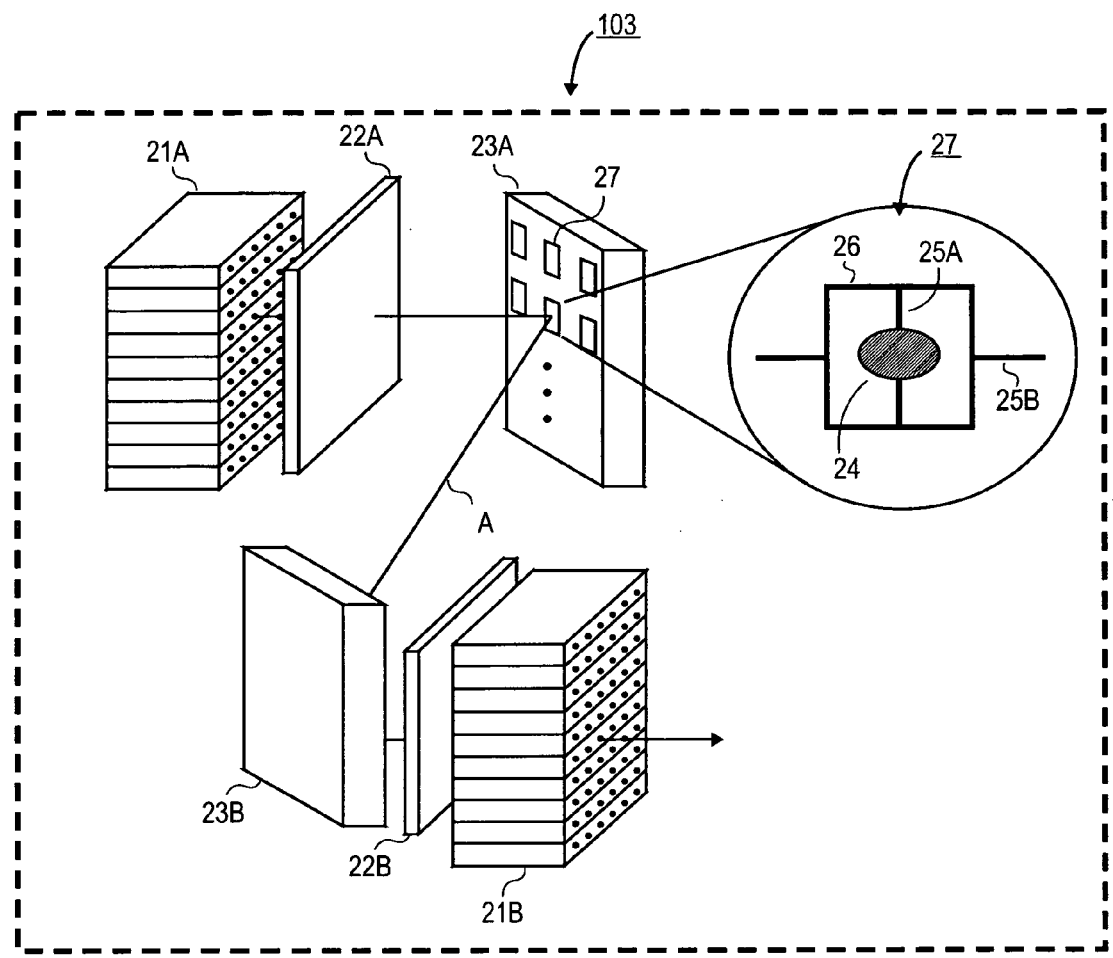
FIG. 3 is a block diagram of an embodiment of an optical switch.

With reference first to FIG. 1(a), one embodiment of the present invention for optical loss control in an optical network 100, using an optical switch composed of two dimensional arrays of movable mirrors, is shown and described. Each fiber 101a through 101n in input fiber array 101 carries one or more optical signals multiplexed using wavelength division multiplexing (WDM). While FIG. 1(a) illustrates an embodiment for a WDM application, it will be appreciated that this invention may be applied to optical switches used in other applications. At least one of the fibers comprising array 101, e.g., fiber 101a, carries more than one optical signal, each signal being at a different wavelength. The wavelengths are separated by wavelength demultiplexers 102a through 102n such that each constituent signal is passed to and carried by a single optical fiber comprising fiber array 110. Each signal from the wavelength demultiplexers 102a through 102n can be individually directed by optical cross-connect switch 103a fiber in fiber array 112 to any of the wavelength multiplexer 104a through 104j (n<j; or n=j; or n>j), where it is combined with signals at other wavelengths, again by WDM, onto an output fiber 106a through 106j of output fiber array 106.

The optical power of each output wavelength from output of switch 103 is monitored by optical tap/detector combination 105a through 105t (t<nj; or t=nj; or t>nj) that splits of some of the optical power and measures the power level with a photo detector. A preferred integrated tap/detector is model IPD-10 from Santec, Inc. (Japan). A control and processor circuitry 107 (e.g., microprocessor TMS320C6211, Texas Instruments, Dallas, Tex.) can be used for control of the mirrors within switch 103 to equalize optical loss or power levels by adjusting the alignment of the mirrors, as will be further described below.

With reference next to FIG. 2, the concept of power balancing in an optical network is illustrated. In FIG. 2(a), loss in increased for connections through the optical cross-connect switch 103 such that all of the outputs have equal power. The signal strength on the input fibers in the example of FIG. 2(a) is arbitrary, and selected for illustrative purposes only. Similarly, the selected output signal strength is arbitrary and will be chosen depending on the desired application of the present invention. This configuration of FIG. 2(a) can also include pre-adjustment, where the output power is adjusted for loss expected in subsequent stages.

FIG. 2(b) illustrates a variation of the application shown and described in FIG. 2(a). In FIG. 2(b), a constant loss value is introduced to each wavelength (individual optical fiber) such that the optical signal strength of each optical signal exiting switch 103 is below a certain selected value. In the example, all connections have the same loss, 3 dB. Of course, as above, the signal strength on the input fibers and the loss and output signal strength in the example of FIG. 2(b) is arbitrary, and selected for illustrative purposes only. The configuration of FIG. 2(b) may also include pre-adjustment, where the output power is adjusted for loss expected in subsequent stages.

Array technology is important for producing large optical switches in volume. An expanded three-dimensional view of the core switch 103 based on array technology is shown in FIG. 3. In one embodiment of a switch implementation, free-space collimated beams are produced by positioning input fibers (not shown) in a fiber block 21a consisting of a two-dimensional array of fibers with a polished end-face and an input lens array 22a. The collimated input beams (e.g., beam A) are directed to input mirror array 23a then output mirror array 23b, where the angle of each mirror in input array 23a and output array 23b can be moved in two axes. While referring to 23a and 23b as input and output mirror arrays, it will be appreciated that switches of the type shown are commonly bi-directional. This allows any optical beam input to be steered to any output lens in array 22b, which focuses the free space beams back into output fiber array 21b where fibers (not shown) carry the optical beam onward.

Lens arrays are available from MEMS Optical (Huntsville, Ala.). Arrays of mirrors that rotate in two axes are available from OpticNet (Campbell, Calif.) and from other vendors, selected depending upon application, requirements, etc. The preferred method of fabricating these mirror arrays will be described subsequently.

Mirror arrays of the type shown in FIG. 3 are generally comprised of mirror assemblies of the type shown in the exploded portion of FIG. 3. As shown therein, each mirror assembly 27 comprises a centrally located mirror structure 24, suspended by torsion members 25a. Mirror structure 24 rotates around the long axis of the torsion members 25a, which act as torsional springs which tend to oppose mirror structure rotation. Mirror structure 24 and torsion members 25a are carried by a frame 26 to which the torsion members 25a are attached. Frame 26 is itself carried by torsion members 25b. Frame 26 rotates around the long axis of the torsion members 25b, which act as torsional springs which tend to oppose rotation of frame 26. Frame 26 and torsion members 25b are carried by an array framework (not shown) which itself does not move significantly relative to the frame/mirror system. As will be discussed further below, mirror 24 and frame 26 may be moved independently of one another. By constructing the assembly with torsion members 25a and 25b perpendicular to one another, a gimbaled mirror assembly may be provided with two full degrees of freedom of motion.

The optical switch configuration shown in FIG. 3 has a loss in decibels that increases as approximately the square of the error in each mirror angle from the optimum alignment. This quadratic loss relationship holds for either axis of input mirror angle and either axis of output mirror angle, where the total loss is approximately the sum in decibels of the loss contribution from each mirror angle error. An example of loss as a function of mirror angle offset is shown in FIG. 4(a), where switch loss is varied by rotating the output mirror.

Figure 4A:
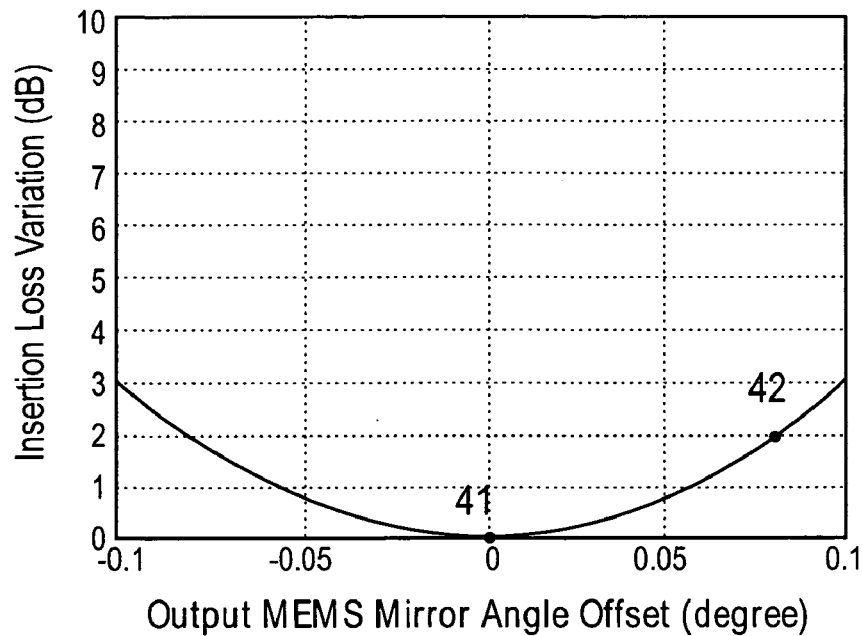
FIG. 4 illustrates how loss detuning increases sensitivity to vibration for minimum loss and loss detuning.

Continuing with reference to FIG. 4(a), near the point of optimum alignment 41, the loss does not change substantially for small angle variations of the input mirror. However, as the mirror is detuned, for example at point 42, to increase the optical loss, the slope of this curve increases, indicating that the sensitivity of the loss to mirror angle is much higher.

Figure 4B:
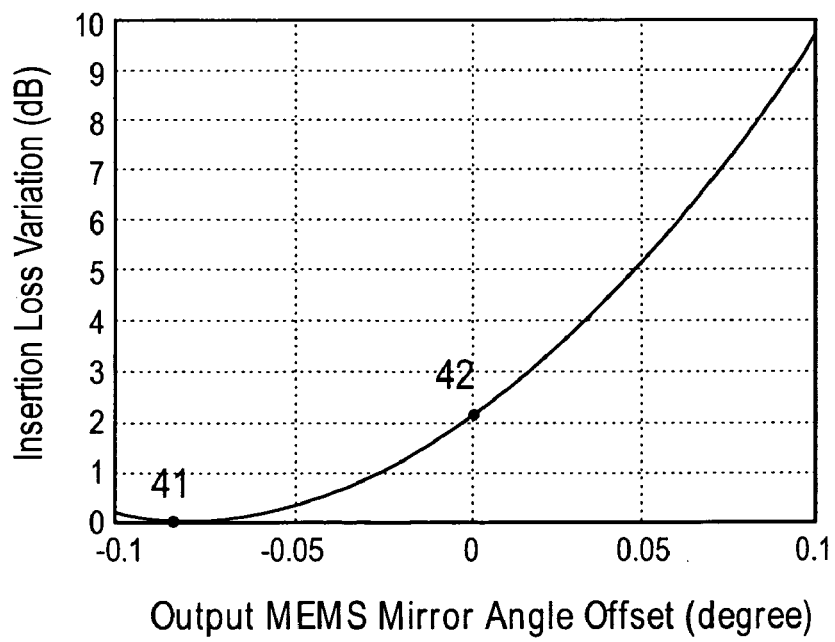

Referring now to FIG. 4(b), the same loss function as in FIG. 4(a) is shown, but the nominal alignment has been shifted to point 42 to give 2 dB of loss. That is, this is the state of the system if one should simply increase the loss to cause the optical signals through switch 103 to have either more uniform optical power or optical power that does not exceed a desired threshold. This increased mirror angle sensitivity creates several problems. One potential problem is sensitivity to control noise on the electrode controlling the mirror angle. A more fundamental problem is greatly increased sensitivity to mechanical vibration.

As previously stated, in typical optical cross-connect switches, switching of an optical input beam between selected optical outputs is accomplished by reflecting the optical beam from an input fiber off of one or more mirrors which, based on the angle of their mirror surfaces to the optical beam, direct the optical beam to the desired output fiber. In such switches, different mechanisms can be used to control the switch mirror angles. According to one technique, magnetic actuation is used by passing current through loops to generate a magnetic field. According to another technique, a voltage is used to rotate the switch mirrors using electrostatic attraction. This voltage is generated by a microprocessor and a digital-to-analog converter, followed by a high-voltage amplifier to generate the voltages needed to drive the mirrors (typically 100–300V). The digital-to-analog converter generates quantization noise because it has a discrete number of possible output voltages. The high-voltage amplifier also generates noise.

As mentioned, it is possible to adjust the "tuning" (i.e., position) of the mirrors, for example to make the output optical power more uniform. Without careful design, however, these noise components can cause excessive amplitude modulation of the light signal as a mirror of the optical switch is detuned to increase the optical loss. Generally the electrical noise can be kept sufficiently small by using a D-A converter with enough resolution to minimize quantization noise.

MEMS mirrors are mechanical structures that tend to respond to mechanical vibration, which can cause undesirable rotation. As illustrated in the graph of FIG. 4(a), for optimum mirror alignment, a small amount of rotation does not cause substantial amplitude modulation. As the mirror is detuned to increase optical loss, however, the vibration-induced rotation of only a few hundredths of a degree can cause excessive amplitude modulation of the optical signal.

The effect of high-frequency vibration can be suppressed by suspending the switch on springs, for example, as disclosed in, U.S. patent application Ser. No. 10/078,057, filed Oct. 25, 2001, titled "Low frequency vibration isolation and damping system," now abandoned, incorporated by reference herein. However, the Telcordia Office Vibration procedure required for optical networking equipment calls for vibration testing at 5 Hz, which is too low a vibration frequency to easily suppress with a passive vibration system.

In addition, a resonance in the test rack can amplify the required 0.1G (that is, 0.1 times the force of gravity) acceleration that is applied to the rack up to 1.5G acceleration at the location where the switch is mounted. Accommodation of vibration at these low frequencies require that the mirrors not be sensitive to low-frequency acceleration of the switch on the order of 1.5G. What is needed is a method to increase the loss of the optical switch for optical power balancing in the network, without increasing the vibration sensitivity.

The present invention includes a mirror embodiment in which rotation in two axes is obtained by a gimbal mirror, one embodiment of which is shown in FIG. 5. This invention may also be applied to mirrors with zero first-order moment of inertia for small acceleration, but some higher-order deflection caused by large acceleration. The mirrors and frames are actuated electrostatically by blades that hang down from the mirror. A cross-section of a mirror is shown in FIG. 5. Blade 57 is electrostatically attracted to blade 58 by applying a voltage difference between the blades produced by voltage source 59. The attraction between blade 57 and blade 58 cause mirror 53 to rotate around torsional spring bars 55 that support the mirror and act as a pivot point. Because the electrostatic force causing rotation is strong, the hinges can be strong, making this blade actuator design well suited for building large optical switches. These strong hinges create a robust mirror array capable of withstanding significant shock. MEMS of this design have survived shock testing up to 1000G.

The disadvantage of the blade actuator geometry is that the center of mass of the mirrors is offset from the hinge pivot axis, resulting in a torque on the mirrors when accelerated due to vibration. Mechanical objects are commonly characterized by a center of mass and a moment of inertia. Acceleration of an object can be calculated based on the force applied to a location represented by the center of mass. The rotation of an object can be calculated by knowing the force applied perpendicular to the center of mass and the moment of inertia. The moment of inertia depends on the mass of the mirror and the distance of the center of mass from the pivot point, which in this case is the mirror hinge. The blade actuator design of FIG. 5 has a relatively large moment of inertia, resulting in significant mirror rotation under acceleration.

A cross-section of the switch illustrating the effect of acceleration is shown in FIG. 6, with an input fiber 61 a and input collimating lens 62a directing the optical beam B onto input mirror 63a. Mirror 63a is suspended by torsional bars that act as a pivot point 65a, and also provide a restoring force for the mirror. Mirror 63a rotates to direct the optical beam onto output mirror 63b, which also has torsional bars that act as a pivot point 65b. Mirror 63b rotates to couple to optical beam B through focusing lens 62b to output fiber 61b.

Each mirror is represented by a heavy mass 64a and 64b located at the actual center of mass of the mirror; the actual reflective surfaces 63a and 63b are of a less significant mass compared to the blade structure. Acceleration of the switch in the vertical direction with respect to the illustration of FIG. 6 (labeled 'perpendicular acceleration') does not induce significant mirror rotation. In this acceleration direction, the hinge is approximately in line with the center of mass of the mirror.

Acceleration of the switch in the horizontal direction (labeled 'mirror acceleration') will cause force in a direction opposite the acceleration. The inertial force 66a will produce counterclockwise rotation of input mirror 63a, and the force

66*b* will cause clockwise rotation of output mirror 63*b*. For the purposes of this discussion, mirror angles are measured as positive for counter-clockwise rotation, so acceleration in the 'mirror acceleration' direction causes the angle of input mirror 63*a* to increase and output mirror 63*b* to decrease.

Motion in the switch in the 'frame acceleration' direction is indicated by a circle with a dot in the center in FIG. 6. This notation uses the point of an arrow moving out of the page to show the direction of motion. Acceleration of the switch in this 'frame acceleration' direction out of the plane of the illustration will produce the same direction of rotation in both frame angles. The frame angles for both input and output mirrors are measured positive when vectors drawn normal from the mirror to the other mirror direction rotate out of the page.

Optical signal strength may be measured, for example, by optical taps located in the optical path. For example, free-space beam splitter 67*a* may be introduced to direct a focused portion of beam B though lens 69 to an optical power detector 68*a*. Likewise, fiber-optic power splitter 67*b* may be introduced to direct a portion of beam B to an optical power detector 68*b*, after beam B has been coupled into optical fiber 61*b* by lens 62*b*.

Figure 7A:
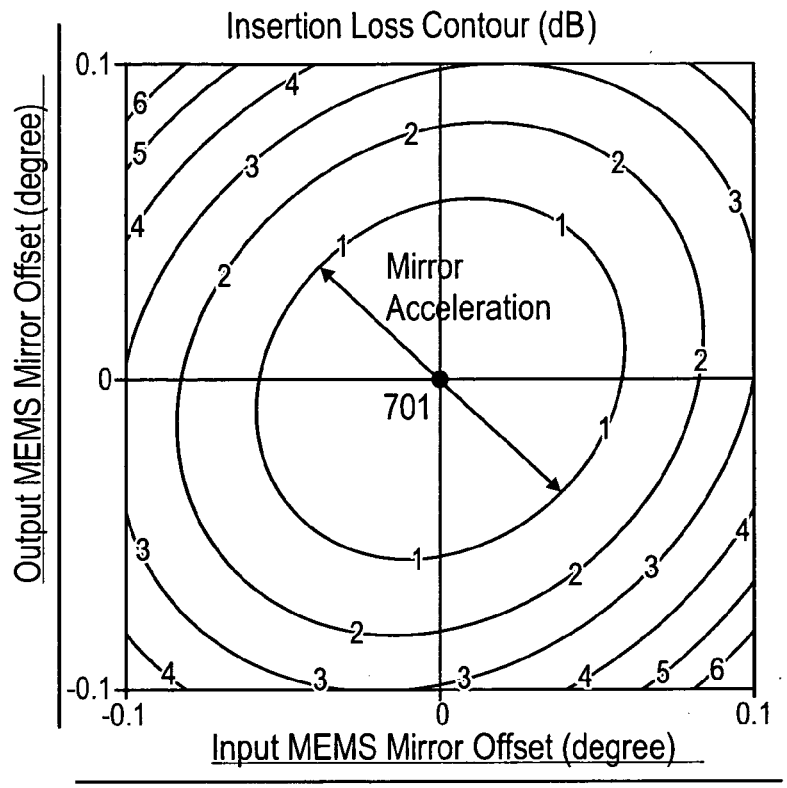
FIG. 7 illustrates insertion loss in an optical switch at the point of optical alignment for minimum loss, with (a) a contour plot for input and output mirror angle offsets (b) a contour plot for input and output frame angle offsets.
Figure 7B:
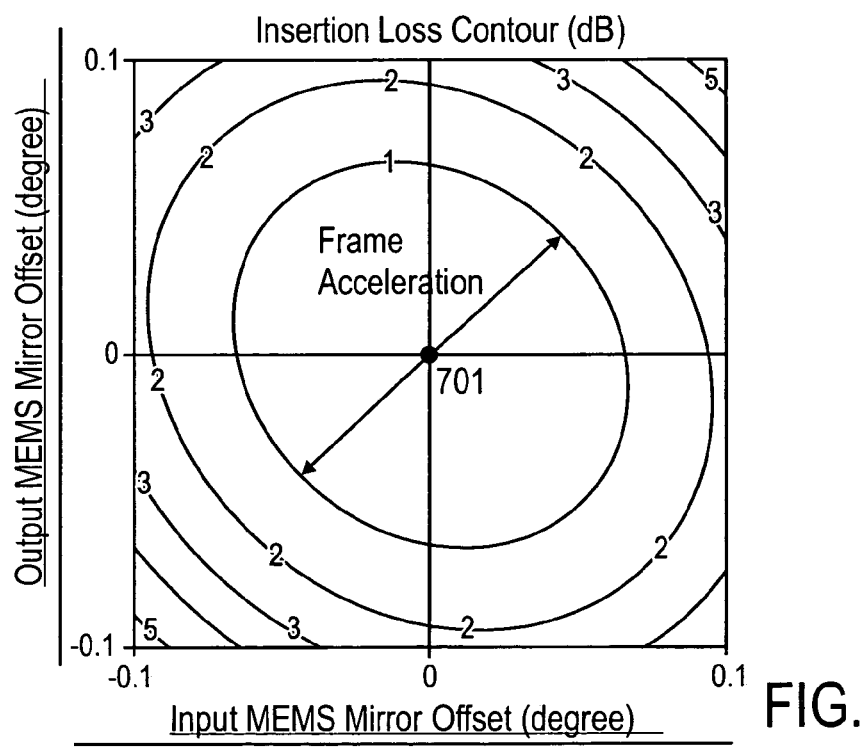

A contour plot of the loss of a switch that is otherwise optimally aligned is shown in FIG. 7(*a*) as a function of misalignment of the input mirror angle and output mirror angle. A contour plot of the loss of the switch is shown in FIG. 7(*b*) as a function of misalignment of the input frame and output frame angle relative to optimum alignment. The contour lines are widely spaced near optimum alignment point 701, indicating that the loss is not changing for small angular variations due to 'mirror acceleration' or 'frame acceleration'.

Figure 8B:
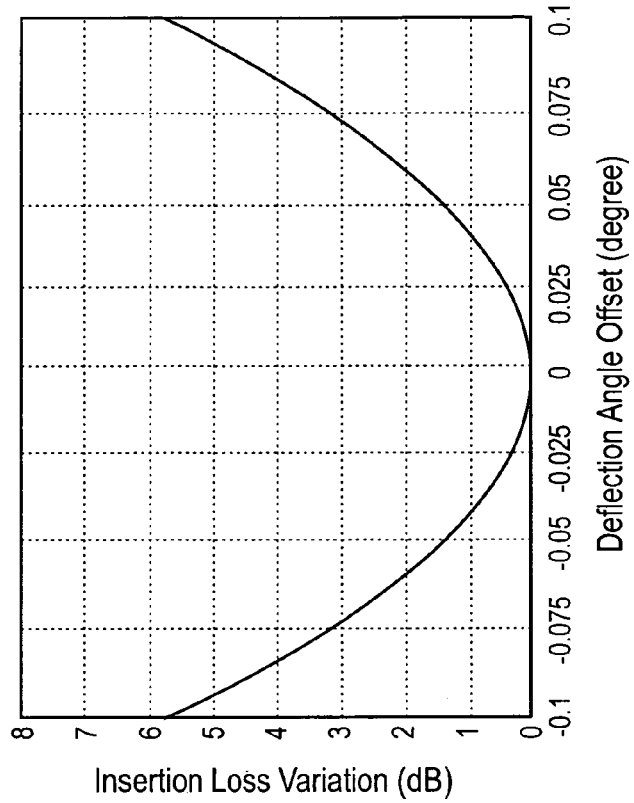
FIG. 8 illustrates insertion loss in an optical switch at the point of optical alignment for minimum loss, with linear plots for (a) input and output mirror angle coupled by vibration, and (b) input and output frame angle coupled by vibration.
Figure 8A:
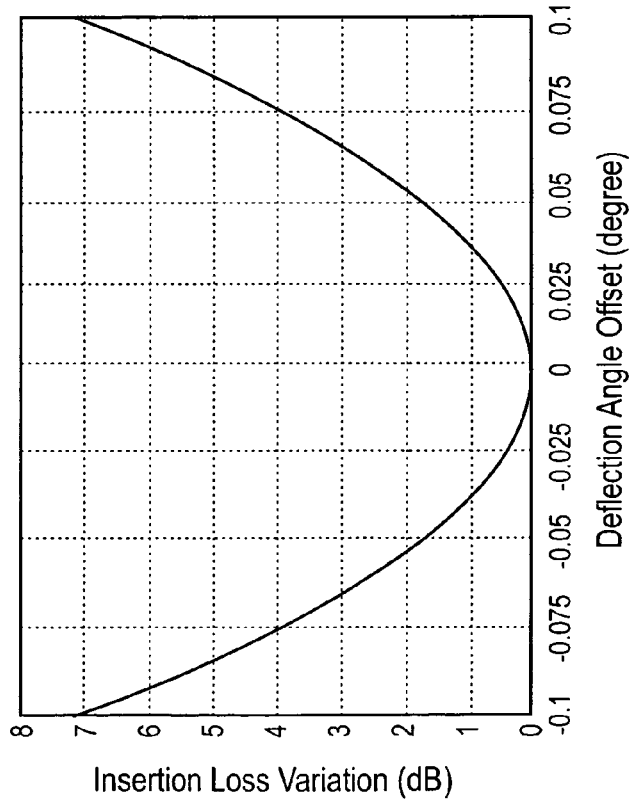

Vibration at frequencies well under the MEMS resonance (<<600 Hz) induces correlated motion between both mirrors or both frames. Vibration in the 'mirror acceleration' direction of FIG. 6 causes one mirror angle to increase and one mirror angle to decrease, resulting in motion along the control plot of FIG. 7(*a*) labeled 'mirror acceleration.' The loss function resulting from moving along this line of the contour plot produces the graph of loss of FIG. 8(*a*) showing loss as a function of coupled mirror motion. Vibration in the 'frame acceleration' direction of FIG. 6 causes both frame angles to increase or decrease, resulting in motion along the control plot of FIG. 7(*b*) labeled 'frame acceleration.' The loss function resulting from moving along this frame motion line of the contour plot produces the graph of loss of FIG. 8(*b*) showing loss as a function of coupled frame motion.

Figure 9A:
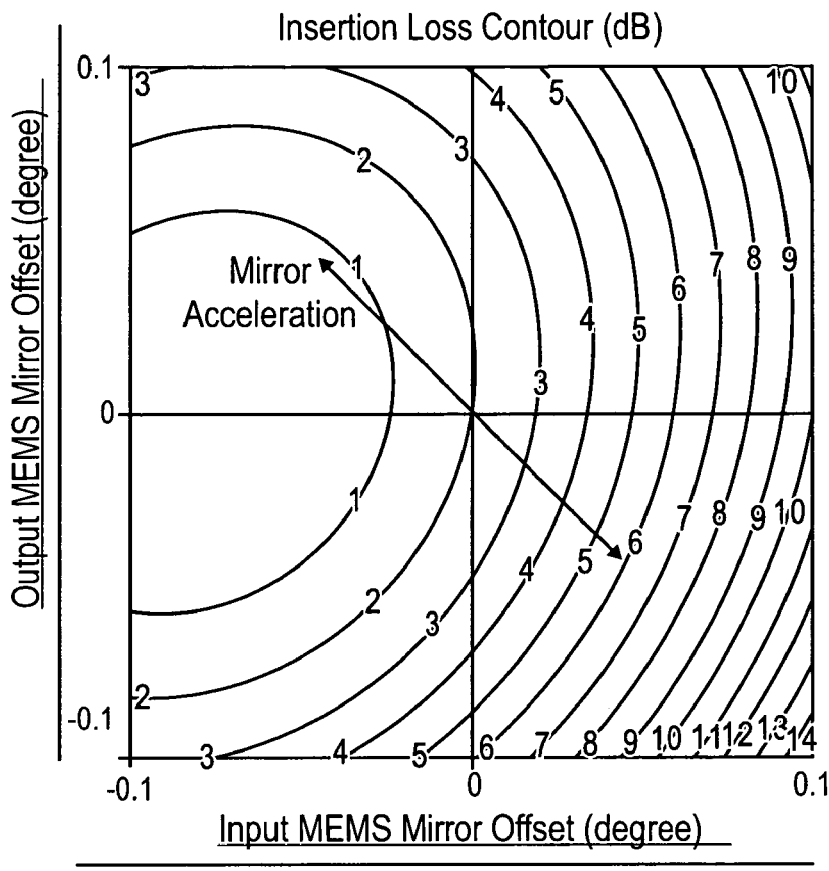
FIG. 9 illustrates insertion loss in a switch with a single misaligned input mirror, showing insertion loss contour plots with varied input and output mirror angle offsets, and a linear plot with input and output mirror angles coupled by vibration.
Figure 9B:
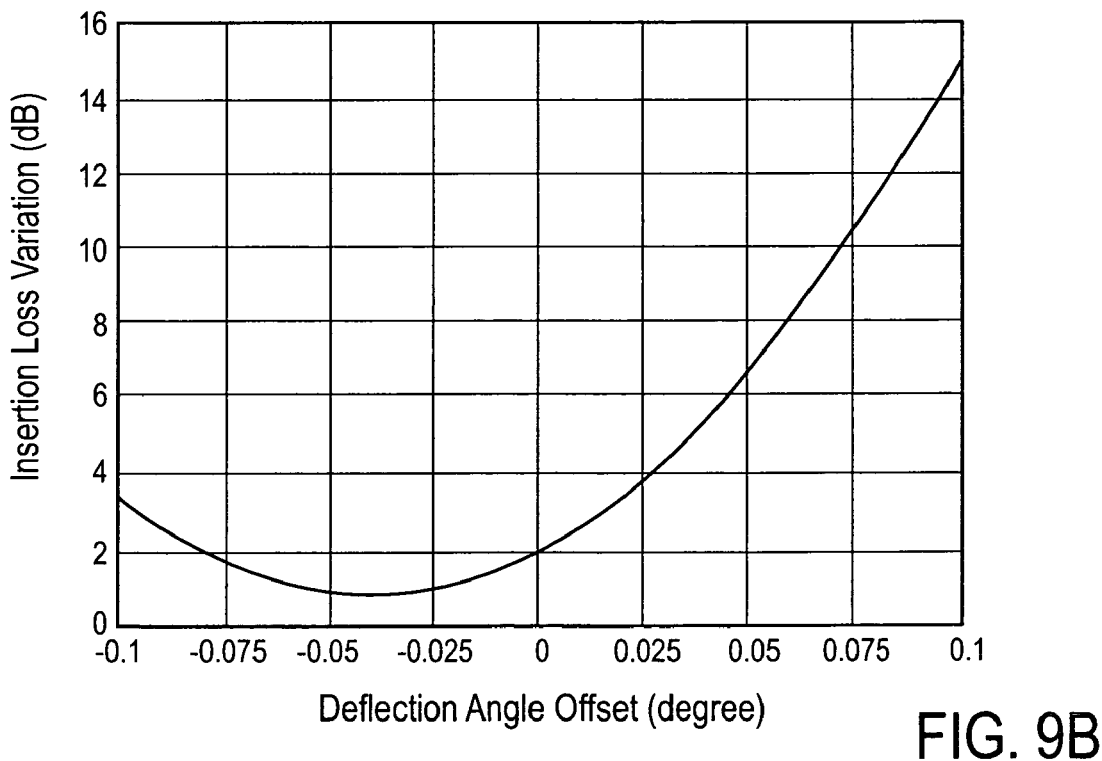

Detuning an input mirror to generate a loss of 2 dB produces the contour plot shown in FIG. 9(*a*) for offsets in input and output mirror angle. Near the center of the graph corresponding to the 2 dB loss point, the contour lines are more closely spaced than the case in FIG. 7(*a*) without loss detuning. Input mirror angle changes represented by horizontal motion on the contour plot cause more rapid loss variation than for an optimally aligned switch. Output mirror angle changes represented by vertical motion on the contour are parallel to contours of constant loss, so small changes in the output mirror angle do not significantly change loss.

Vibration causes motion in both the input mirror and output mirror, resulting in loss due to coupled input and output mirror motion as shown in FIG. 9(*b*). The slope of this line is much higher than for the example of FIG. 8(*a*) tuned for minimum loss, resulting in more amplitude variation from small mirror motion with mirror detuning as was predicted by the graph of FIG. 4.

Figure 10A:
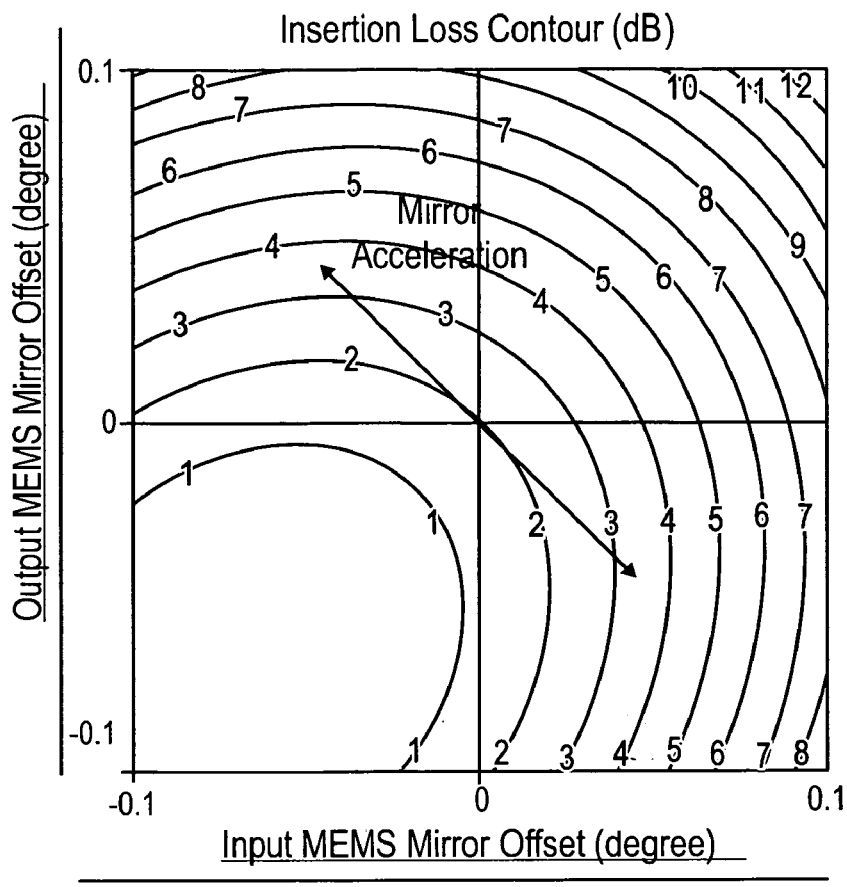
FIG. 10 illustrates insertion loss in a switch with input and output mirrors misaligned equally in the same direction, showing an insertion loss contour plot for varied input and output mirror angle offsets, and a linear plot with input and output mirror angles coupled by vibration.
Figure 10B:
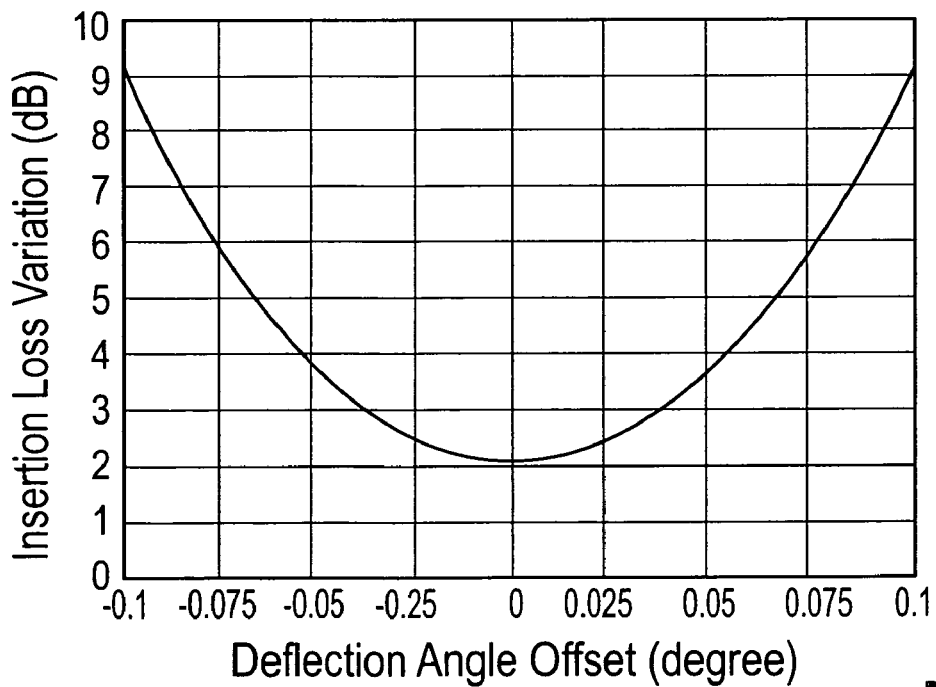

Detuning both mirrors equally in the same direction to produce 2 dB of loss gives the contour plot for mirror angle offset as shown in FIG. 10(*a*). Here acceleration of the switch in the 'mirror acceleration' direction produces an increase in loss from the input mirror and a decrease in loss from rotation of the output mirror, resulting in fairly constant optical loss if the magnitude of these input mirror angle and output mirror angle variations are approximately equal. This acceleration in the 'mirror acceleration' direction causes motion parallel to the loss contours resulting in low amplitude modulation, which can also be seen in FIG. 10(*b*).

Figure 11A:
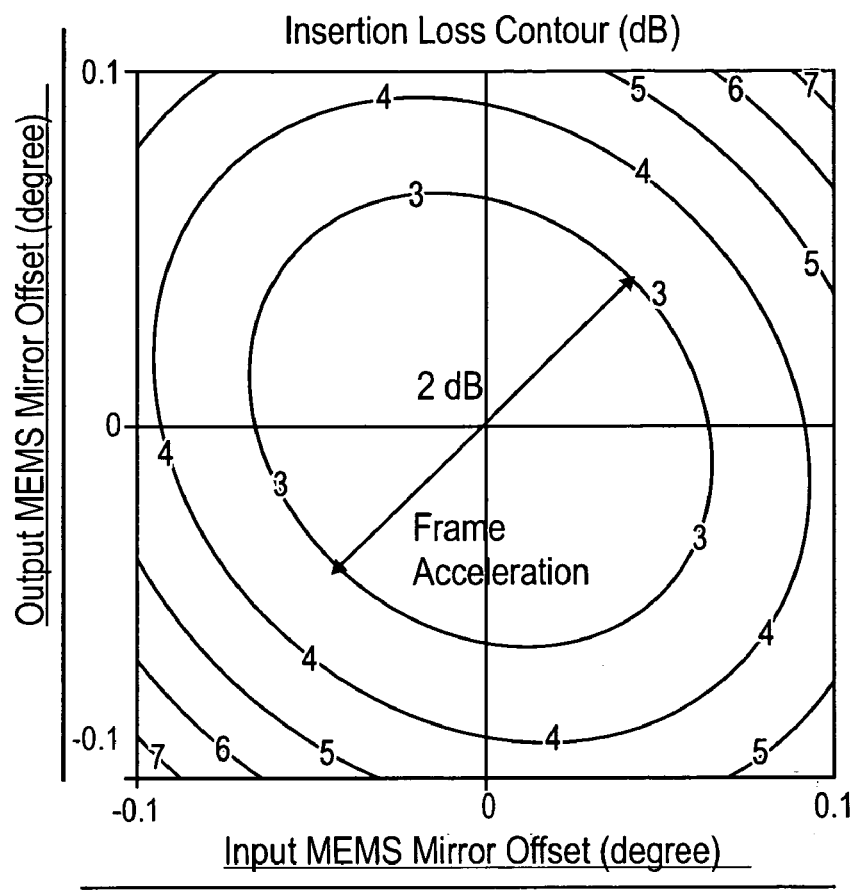
FIG. 11 illustrates insertion loss in a switch with input and output mirrors misaligned in the same direction, showing an insertion loss contour plot for varied input and output frame angles, and a linear plot with input and output frame angles coupled by vibration.
Figure 11B:
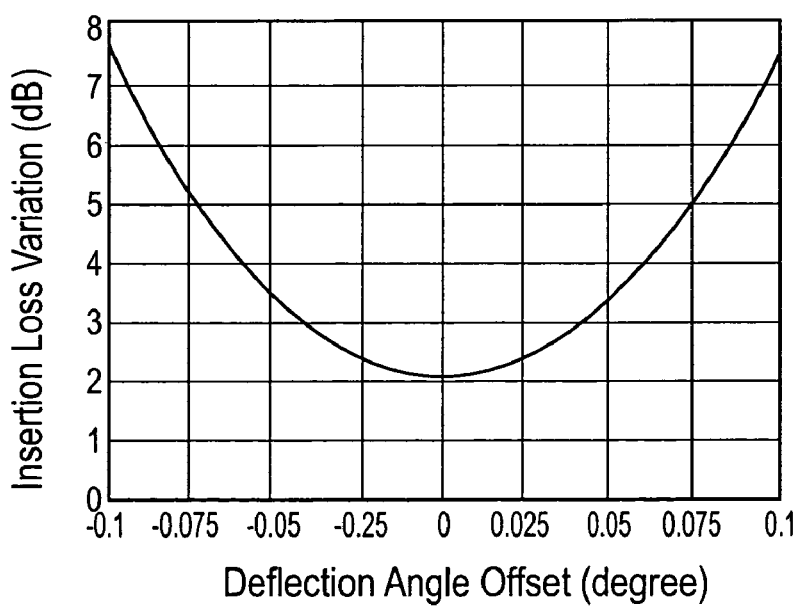

The mirror misalignment illustrated in FIG. 10 produces a frame motion loss control plot shown in FIG. 11(*a*). The best frame alignment produces a loss of 2 dB, because frame alignment cannot make up for the 2 dB loss attributable to misalignment of the mirrors. When the frames are aligned for minimum optical loss, small variations of either input or output frame angle do not significantly change the optical loss as shown in FIG. 11(*b*). As FIG. 11 demonstrates, mirror misalignment does not qualitatively change the frame misalignment curve, and frame misalignment does not qualitatively change the mirror misalignment curve. Consequently the remaining curves will show only mirror misalignment or frame misalignment.

Figure 12A:
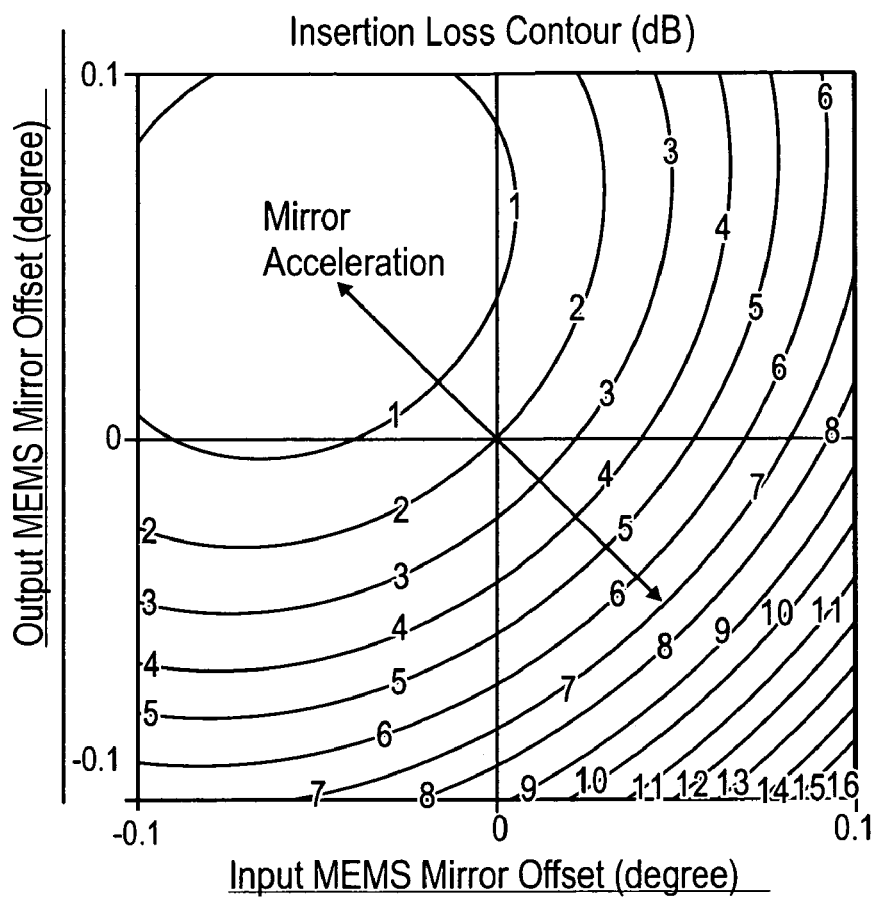
FIG. 12 illustrates insertion loss in a switch with input and output mirrors misaligned in opposite directions, showing an insertion loss contour plot for varied input and output mirror angle offsets, and a linear plot with input and output mirror angles coupled by vibration.
Figure 12B:
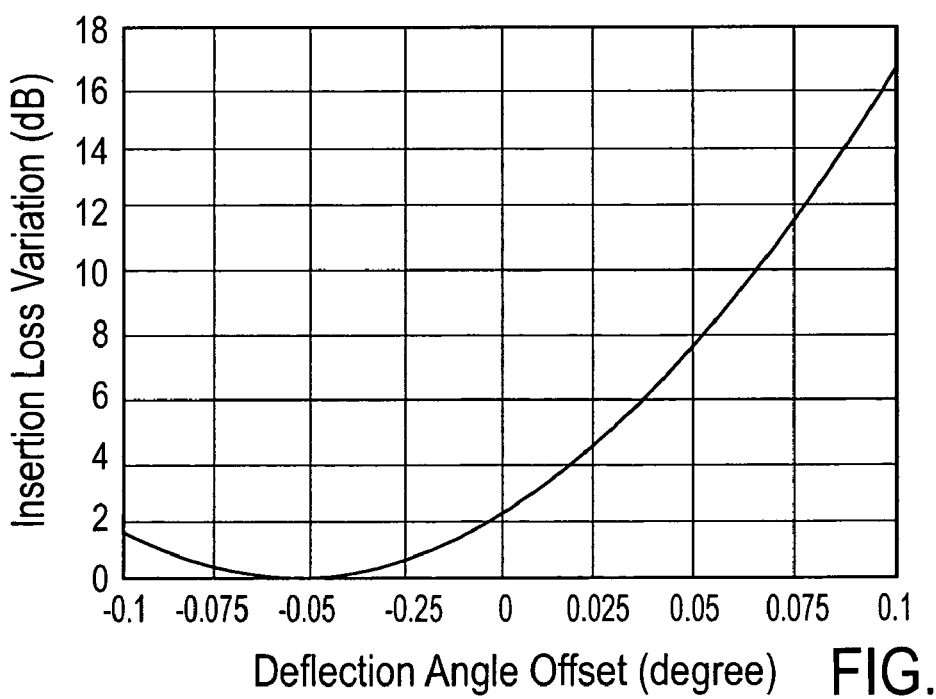

Detuning both mirrors equally in the opposite direction to produce 2 dB of loss gives the contour plot shown in FIG. 12(*a*). Here acceleration of the switch in the 'mirror acceleration' direction is perpendicular to the mirror loss contours, so acceleration produces both an increase in loss from the input mirror and an increase in loss from rotation of the output mirror. These loss terms add to enhance sensitivity to vibration as shown in FIG. 12(*b*).

Figure 13A:
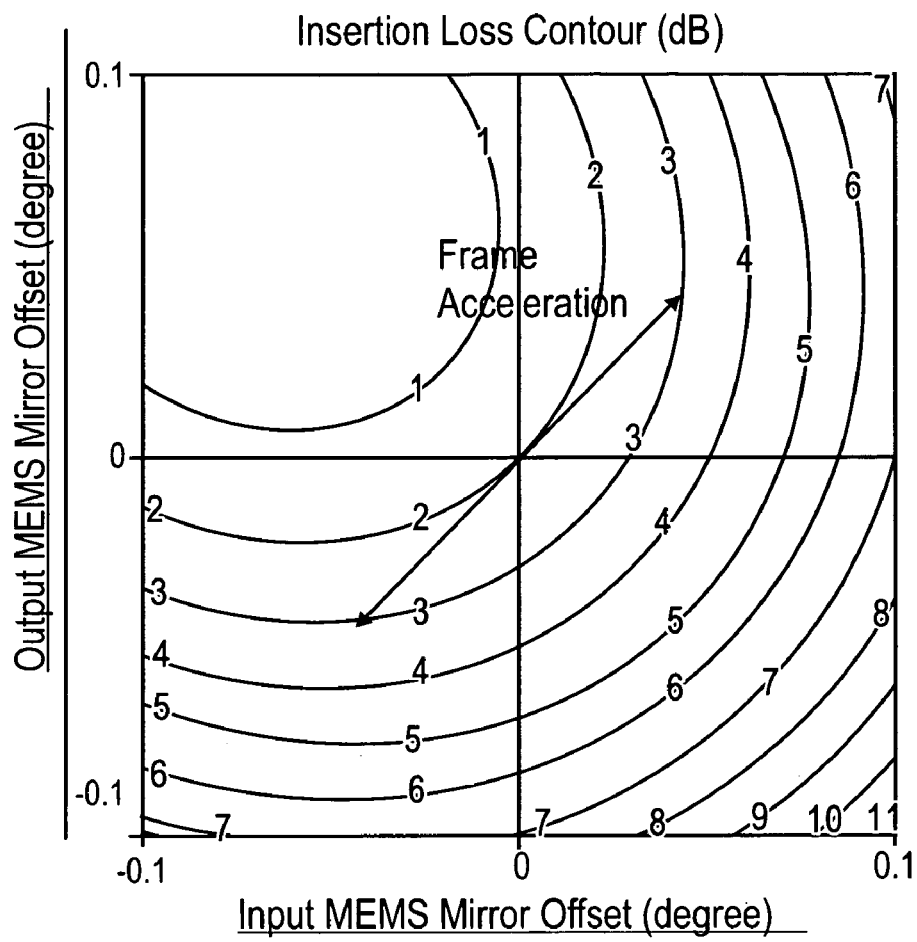
FIG. 13 illustrates insertion loss in a switch with input and output frames misaligned in different directions, showing a contour plot for input and output frame angle offsets, and a linear plot with input and output frame angles coupled by vibration
Figure 13B:
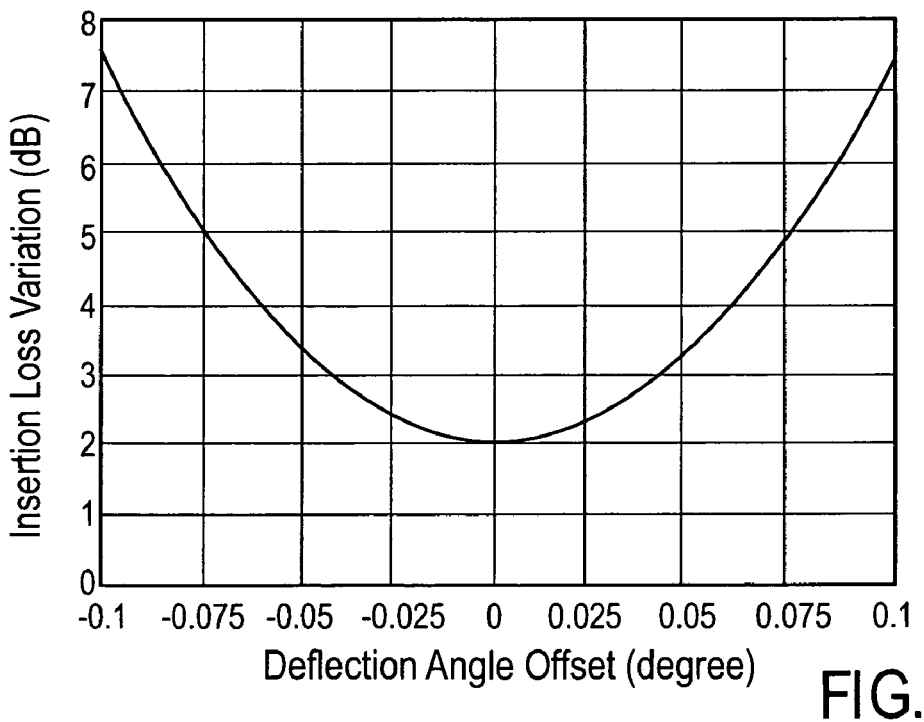

The input and output frame angles can be detuned from the minimum loss condition, instead of detuning the input and output mirror angles. Detuning both frames simultaneously in opposite directions to produce 2 dB of loss gives the contour plot for frame misalignment shown in FIG. 13(*a*). Although the frame angles are detuned in opposite directions, each frame angle is measured with respect to its mirror array, so for this detuning condition vectors drawn normal to the input and output mirror in the illustration of FIG. 6 rotate out of and into the page for the input and output mirror, respectively. Here, acceleration of the switch in the 'frame acceleration' direction produces an increase in loss from rotation of the input frame and a decrease in loss from rotation of the output frame, resulting in fairly constant optical loss if these input frame angle and output frame angle variations are matched.

Just as mirror angle detuning does not enhance vibration sensitivity of the frame angles, as demonstrated in FIG. 11, so frame angle detuning does not enhance vibration sensitivity of the mirror angles. Thus, the switch is relatively insensitive in the 'mirror acceleration' direction as well as the 'frame acceleration' direction when loss detuning using frame angles, as it was for loss detuning using mirror angles.

The previous examples assumed that acceleration produced the same magnitude of rotation in both mirrors, or in both frames. The amount of mirror rotation induced by acceleration is determined by the mirror or frame moment of inertia, which determines the rotational force under acceleration, and by the mirror or frame hinge stiffness, which determines the resistance to rotation.

The mass of each mirror is determined by photolithography, so the moment of inertia in general is well matched between mirrors. The hinge stiffness varies as the third power of the hinge width, so the hinge stiffness is much more difficult to control, and precise matching of vibration sensitivity between mirrors is difficult.

Figure 14A:
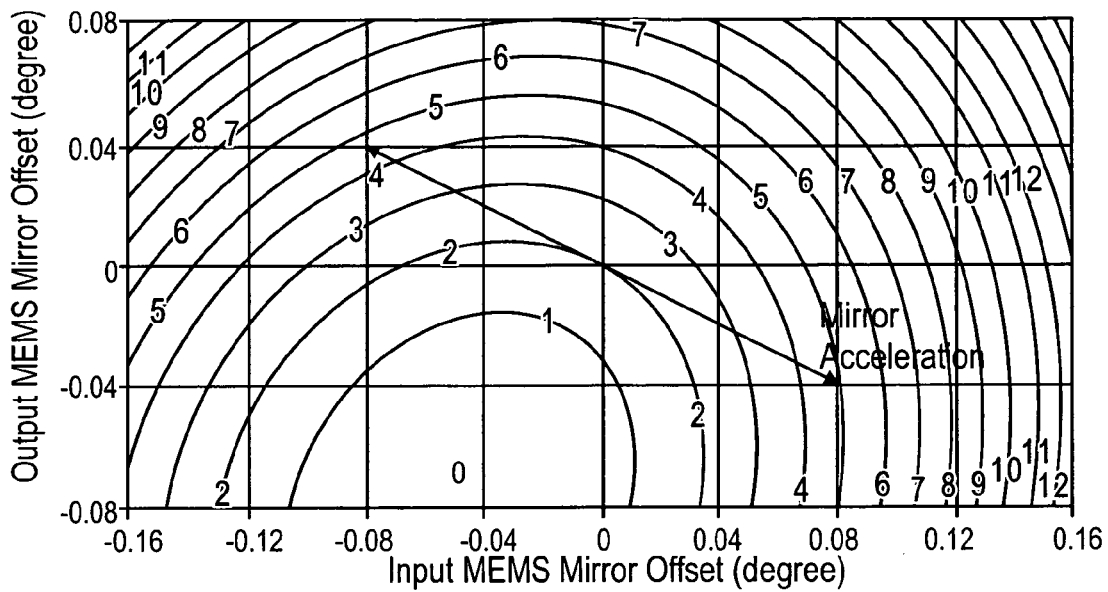
FIG. 14 shows a switch with input and output mirrors misaligned in the same direction by a different amount to compensate for different mirror hinge strengths, showing a contour plot for input and output mirror angle offsets, and a linear plot with input and output mirror angles coupled by vibration.
Figure 14B:
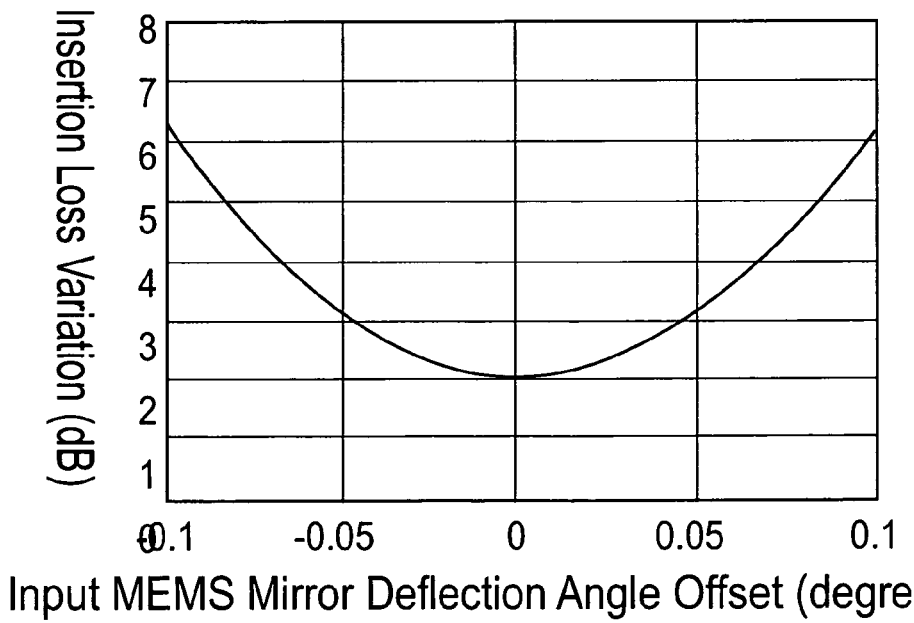

This technique of loss detuning by rotating both mirrors or both frames to suppress vibration dependence can be implemented even if vibration induces a different amount of input and output mirror rotation, or induces a different amount of input and output frame rotation. By detuning input and output mirrors different amounts from the condition of minimum loss, the resulting mirror motion labeled 'mirror acceleration' can still be made parallel to the constant loss contours, giving similar vibration insensitivity to that shown in FIG. 12(b). Detuning both mirrors simultaneously in the same direction by different amounts produces contour plots as shown in FIG. 14(a), where the input mirror is assumed to be twice as sensitive to vibration as the output mirror. A linear plot as a function of rotation of the more sensitive mirror is shown in FIG. 14(b).

Figures 15A, 15B:
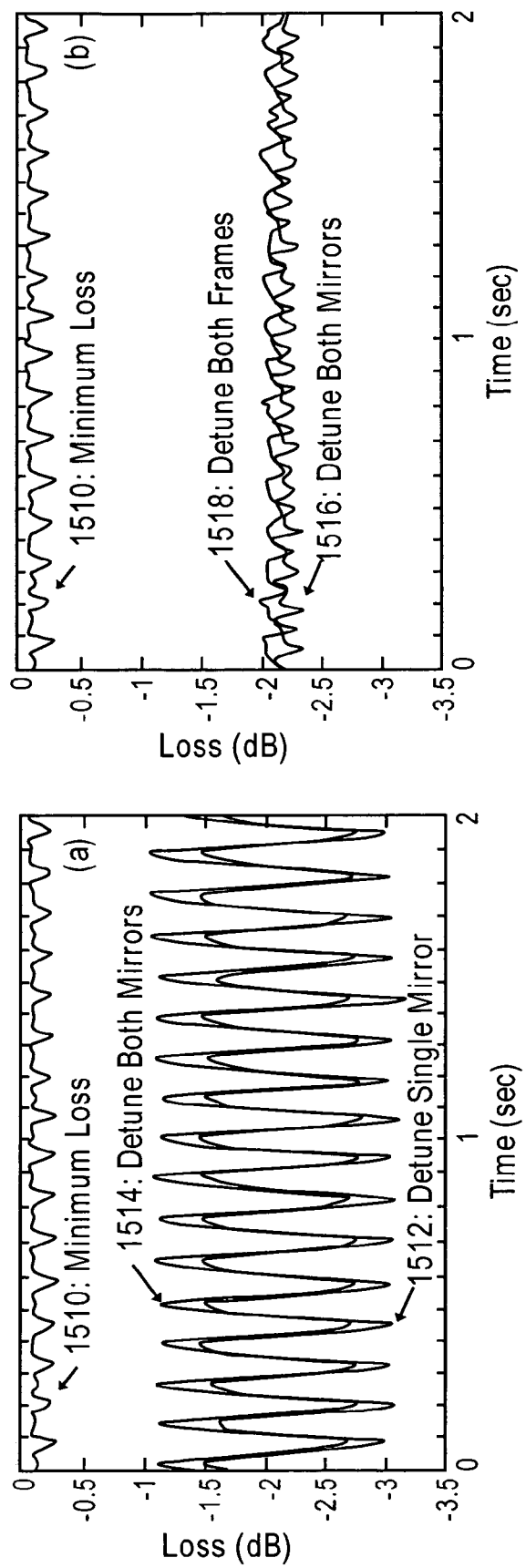
FIG. 15 shows measured vibration sensitivity of a switch when (a) loss detuning using a single mirror and when two mirrors are incorrectly offset so there is no vibration suppression and (b) when using two mirrors offset correctly for vibration suppression, and when using two frames offset correctly for vibration suppression.

Experimental results are shown FIG. 15(a) with a switch under vibration at 8 Hz. The rack was shaken at an amplitude of 0.1G. The switch was mounted in a mechanical system with a net vibration transmissibility of about 1 at 8 Hz, so the switch itself also experienced a vibration level of about 0.1G. First the switch was set for minimum loss, giving the relatively small vibration response 1510. The loss was increased to 2 dB by detuning a single mirror, resulting in the large amplitude vibration of 1512. Detuning both mirrors to give a total of 2 dB loss with the mirrors oriented in the opposite direction such that the vibration response of each mirror adds gave a similar large amplitude variation 1514.

Detuning both mirrors to give a loss of 2 dB with the mirrors oriented in the same direction to cancel vibration sensitivity produces a small amplitude variation 1516, as shown in FIG. 15(a). Detuning both frames to give a loss of 2 dB with the frames oriented in the opposite direction to cancel vibration sensitivity also gave a small amplitude variation 1518.

Very precise mirror angle control is needed for large optical switches. Consequently, one method of mirror control is to measure the optical power coupled into the output fiber, and use feedback to stabilize the optical loss as disclosed in U.S. patent application Ser. No. 09/548,587, titled, "Feedback stabilization of a loss optimized switch," has issued as U.S. Pat. No. 6,456,751 B1. The first step in using feedback stabilization algorithm is to characterize the present switch alignment in order to know what correction to make to the alignment of the mirrors.

One method to characterize switch alignment is to measure the loss of the switch, then adjust each one of the mirror or frame angles, one at a time, away from optimum alignment and again measure the loss of the switch. For better measurement accuracy, switch loss may be measured for both a positive and negative offset of each mirror angle, which uniquely determines the switch alignment. The magnitude of the mirror angle offset to use in this technique is a tradeoff between achieving good signal to noise ratio with a large offset, and achieving minimum amplitude modulation using a small offset. An acceptable compromise is to use a mirror angle offset that results in a 0.1 dB power loss when moving away from optimum alignment.

Figure 16:
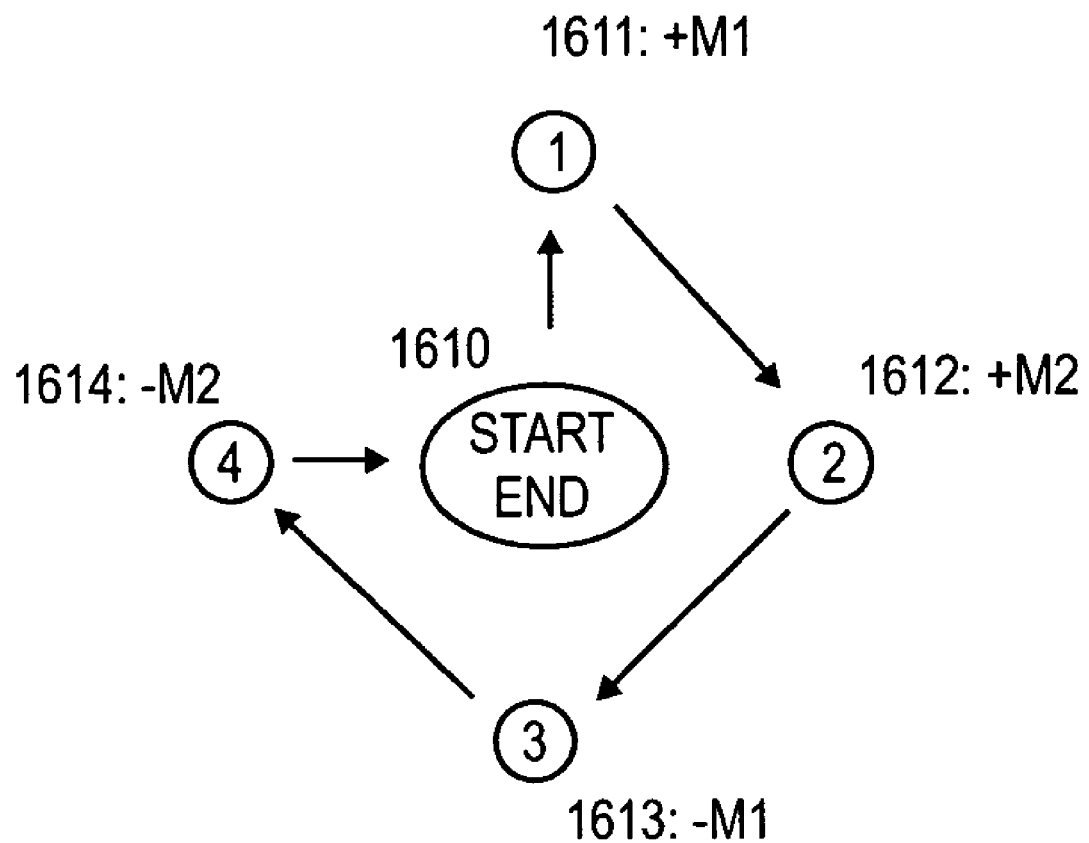
FIG. 16 shows a dither pattern for measuring present alignment of the switch in order to calculate alignment adjustment

A simple procedure for measuring the mirror slopes used to determine the alignment of the input mirror angle and output mirror angle is illustrated in FIG. 16. First, the loss of the switch is measured with the present switch alignment 1610. Then, the input mirror is increased by the predetermined angle offset to position +M1, and power measurement 1611 is made. Next, the input mirror is returned it nominal position and the output mirror angle is increased by the predetermined offset to position +M2, and power measurement 1612 is made. Next, the output mirror is returned to its nominal position and the input mirror angle is decreased by a predetermined offset to position −M1, and power measurement 1613 is made. Next, the input mirror is returned to its nominal position and the output mirror is decreased by the predetermined offset to position −M2, and power measurement 1614 is made. Next, the output mirror is returned to its nominal position, and the sequence of FIG. 16 is repeated for the input frame angle and output frame angle.

In many switch applications it is desired to minimize the optical loss. In this case the switch loss in decibels is approximately the sum of quadratic functions of each mirror angle and each frame angle as shown in the contour plots of FIG. 7. Switch optimization for minimum loss can be performed by optimizing each mirror angle separately.

Figure 17:
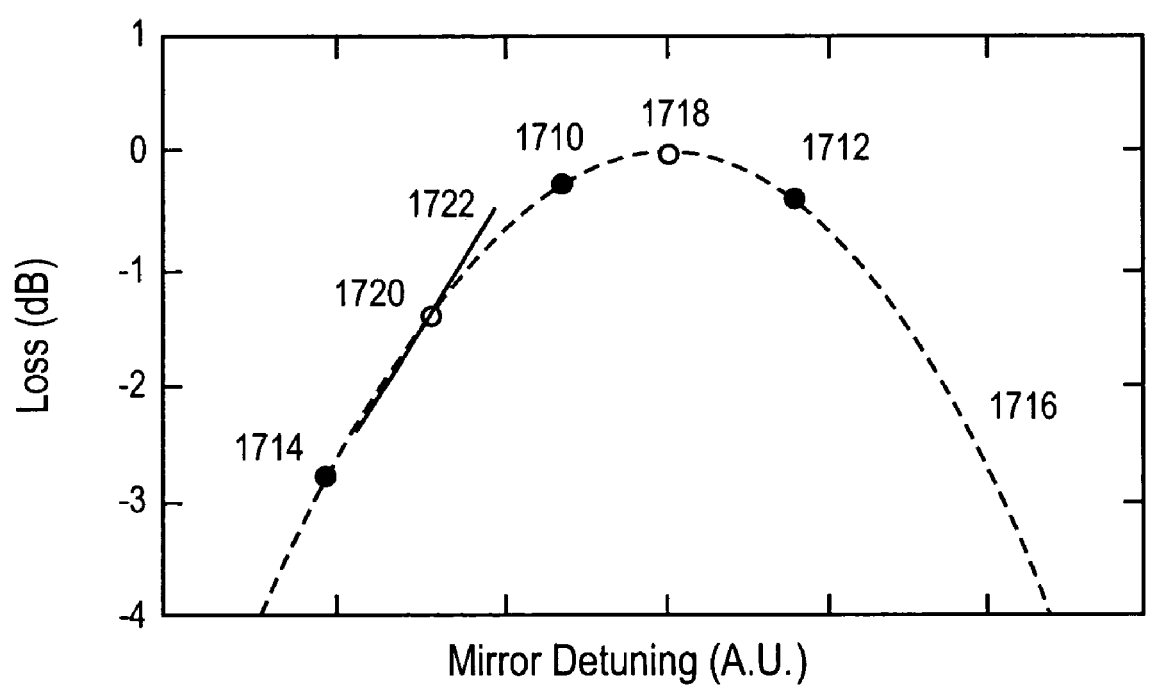
FIG. 17 shows a method of taking power measurements used to determine the optimum switch alignment for a particular mirror or frame angle.

Loss measurements are taken at the nominal mirror alignment 1710, for a positive mirror offset 1712, and a negative mirror offset 1714 as shown in FIG. 17. For each mirror angle, the three measurements are curvefit to a quadratic function 1716. For minimizing loss, the angle is changed to the angle 1718 corresponding to the maximum of the curvefit 1716.

The procedure of stabilizing the switch alignment at a value other than that of minimum loss is very similar to the process of minimizing switch loss. To increase the loss of the switch, the alignment of the input and output mirrors or input and output frames is changed to move the switch alignment to the point 1720 matching the appropriate slope 1722 needed to provide the correct loss as shown in FIG. 17.

For a switch with the mirror angles detuned to induce loss, the input and output mirror are aligned away from the minimum loss condition as shown, while the input and output frame angles are aligned to minimize loss. For a switch with the frame angles detuned to induce loss, the input and output frames are aligned away from the minimum loss position, while the input and output mirror angles are aligned to minimize loss.

Figure 18:
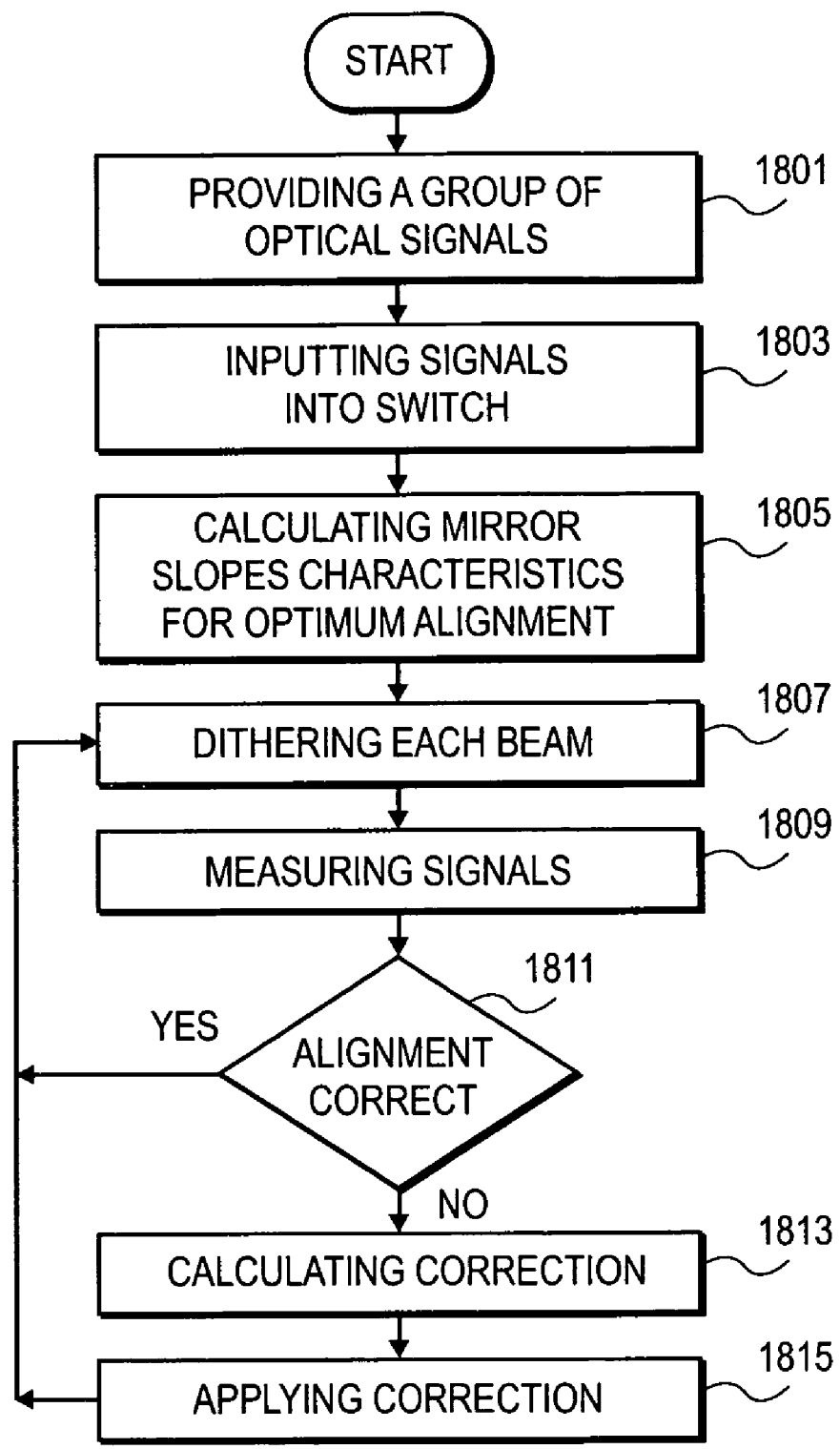
FIG. 18 shows a control algorithm for feedback stabilization at the point of low vibration sensitivity.

The process of optimizing the switch for a given loss is shown in FIG. 18. The first step 1801 is propagating a group of optical switches 1801, and inputting the signals to an optical switch 1803. The next step is calculating the desired slope for each mirror and frame angle to give the desired attenuation 1805, then moving each beam through a dither pattern 1807. The next step is detecting the beam and measuring optical power at point in the dither pattern 1809, then determining if the alignment is correct 1811. If the alignment is not correct, the next step is calculating the correction to the alignment 1813, then applying that correction 1815. The process is repeated to maintain optical alignment, starting by dithering each beam 1807.

Although several embodiments of this invention have been described in detail herein with reference to the accompanying drawings, it is to be understood that the present invention is not limited to these precise embodiments, and that various changes and modifications may be effected thereto by one skilled in the art without departing from the spirit and scope of the present invention as defined in the appended claims.

What is claimed is:

1. An optical switch apparatus to control loss in an optical network comprising:
at least a first and a second plurality of movable mirrors for directing optical signals from an input of the optical switch to an output of the optical switch, wherein each optical beam is directed by one mirror of the first plurality and one mirror of the second plurality;

at least one optical detector located in an optical path to determine the power of an optical beam;

at least one actuator for each mirror to move the mirror in a certain position based on the determined power, wherein loss of power can be increased by moving the first and/or the second mirror away from the optimum angle for minimum loss.

2. The apparatus of claim 1, wherein the mirrors are constructed as gimbal mirrors mounted for rotation in two perpendicular axes.

3. The apparatus of claim 2, wherein the mirrors of the first and second plurality of movable mirrors are moved in opposite directions with respect to the same axes to increase the loss of power.

4. The apparatus of claim 1, wherein the mirrors of the first plurality and the mirrors of the second plurality have opposite vibration sensitivity.

5. The apparatus of claim 1, wherein the mirrors of the first plurality and the mirrors of the second plurality move in opposite direction if they are accelerated in the same direction.

6. The apparatus of claim 1, wherein the first and second mirrors are moved in opposite directions to increase the loss of power.

7. The apparatus of claim 1, wherein the mirrors have losses in decibels that increase as approximately the square of the error in each mirror angle from the optimum alignment.

8. The apparatus of claim 1, wherein the first and second plurality of movable mirrors are arranged as two dimensional arrays of movable mirrors.

9. The apparatus of claim 1, wherein a first optical detector is located in an optical path before the first mirror and a second optical detector is located in the optical path beyond the second mirror.

* * * * *